(12) United States Patent
Tejima

(10) Patent No.: US 7,944,621 B2
(45) Date of Patent: May 17, 2011

(54) ZOOM LENS SYSTEM AND A PROJECTOR WITH THE ZOOM LENS SYSTEM

(75) Inventor: Yasuyuki Tejima, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 36 days.

(21) Appl. No.: 12/540,589

(22) Filed: Aug. 13, 2009

(65) Prior Publication Data

US 2010/0046087 A1      Feb. 25, 2010

(30) Foreign Application Priority Data

Aug. 25, 2008   (JP) ................................ 2008-215019

(51) Int. Cl.
*G02B 15/14* (2006.01)
(52) U.S. Cl. ........................................ 359/689; 359/676
(58) Field of Classification Search .................. 359/676, 359/680–682, 689
See application file for complete search history.

(56) References Cited

U.S. PATENT DOCUMENTS
7,079,325 B2 *   7/2006 Konno ........................ 359/682

FOREIGN PATENT DOCUMENTS
JP          2004-271668 A      9/2004

* cited by examiner

*Primary Examiner* — Joseph Martinez
*Assistant Examiner* — James R Greece
(74) *Attorney, Agent, or Firm* — Holtz, Holtz, Goodman & Chick, PC

(57) ABSTRACT

A zoom lens system comprising, arranged sequentially from the enlarging side to the reducing side, a first lens group having a negative refractive power as a whole, a second lens group having a positive refractive power as a whole and a third lens group having a positive refractive power as a whole. The third group is fixed during the zooming. The first lens group moves along an optical axis from the enlarging side to the reducing side during zooming from the wide angle end to the intermediate area. The first lens group also moves along the optical axis from the reducing side to the enlarging side during zooming from the intermediate area to the telephoto end. The second lens group moves along the optical axis from the reducing side to the enlarging side during zooming from the wide angle end to the telephoto end. Thus, the zooming operation of the whole lens system is achieved.

10 Claims, 9 Drawing Sheets

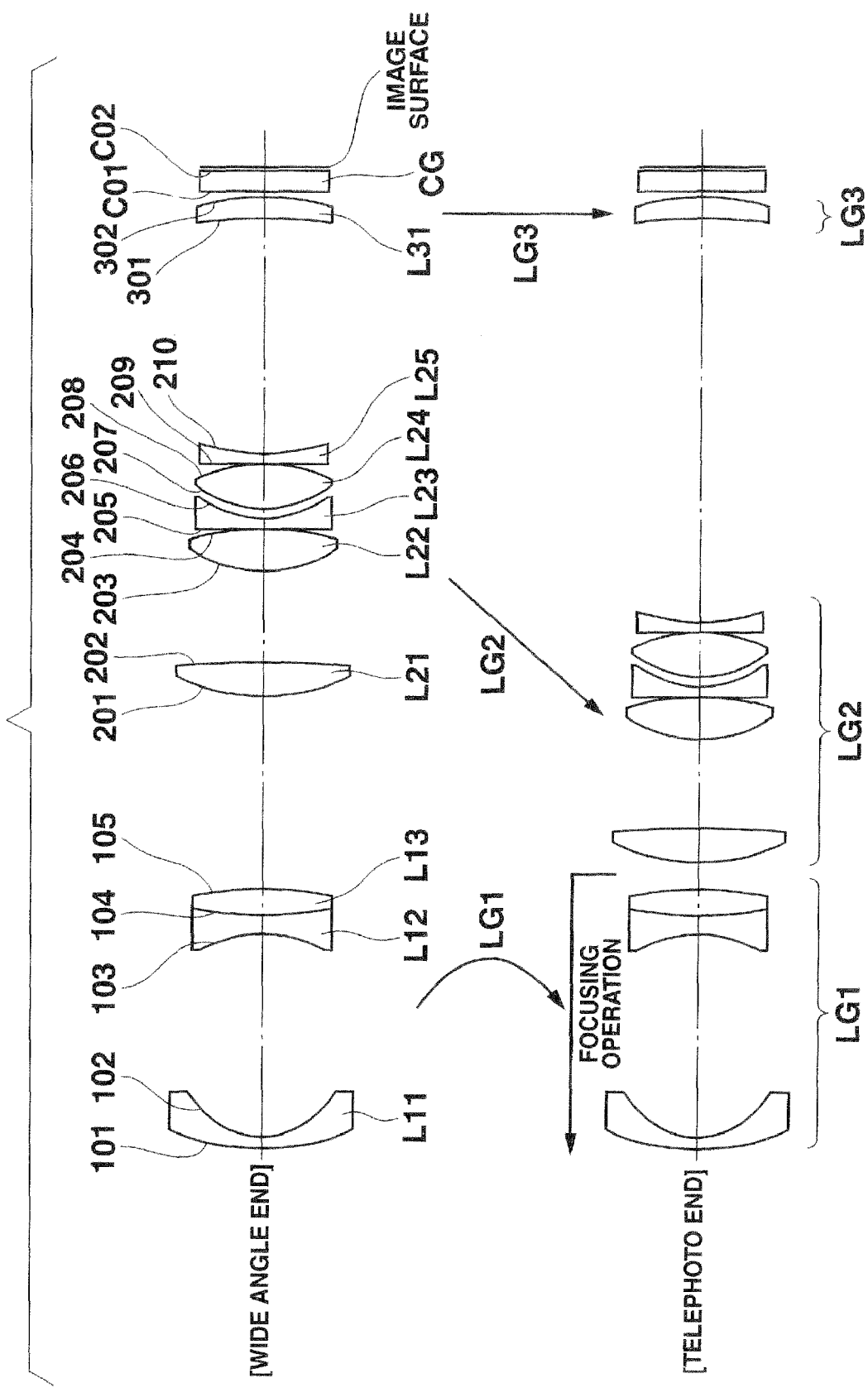
FIG. 1 (EMBOD. 1)

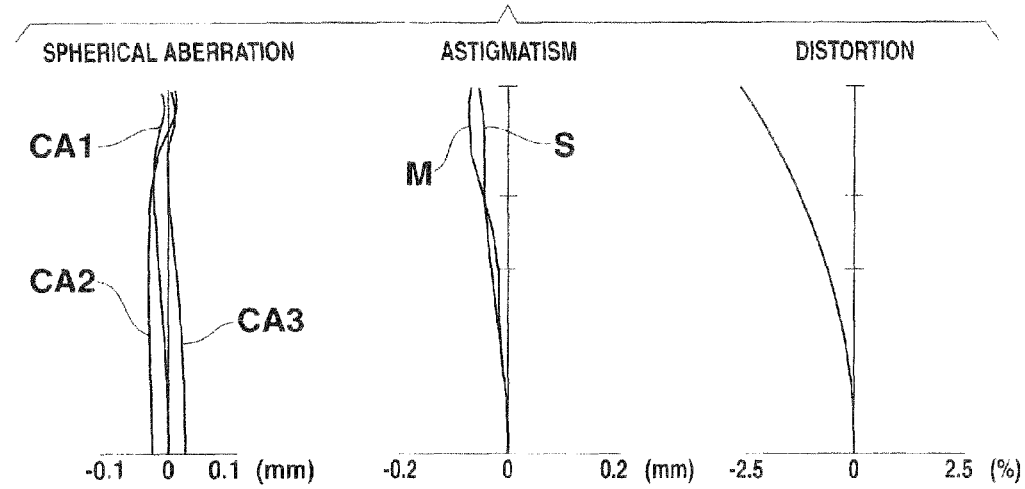
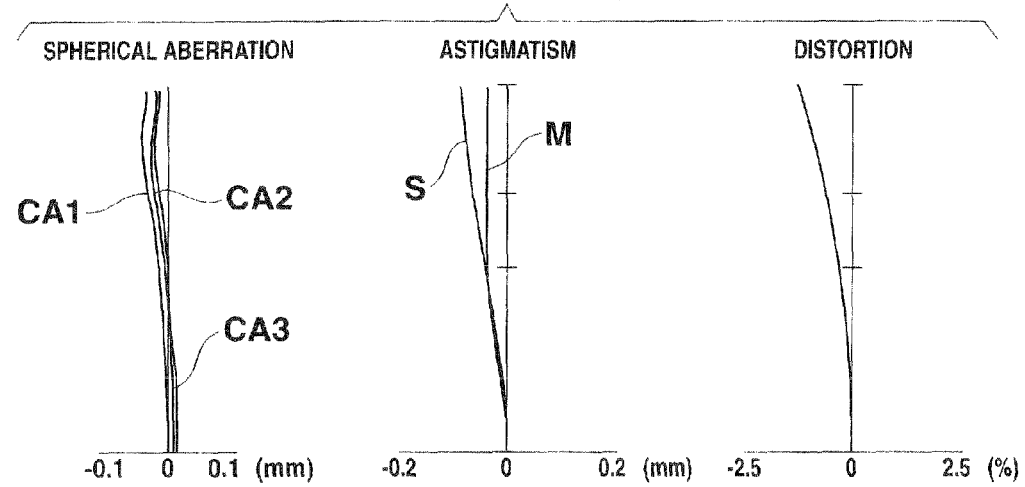
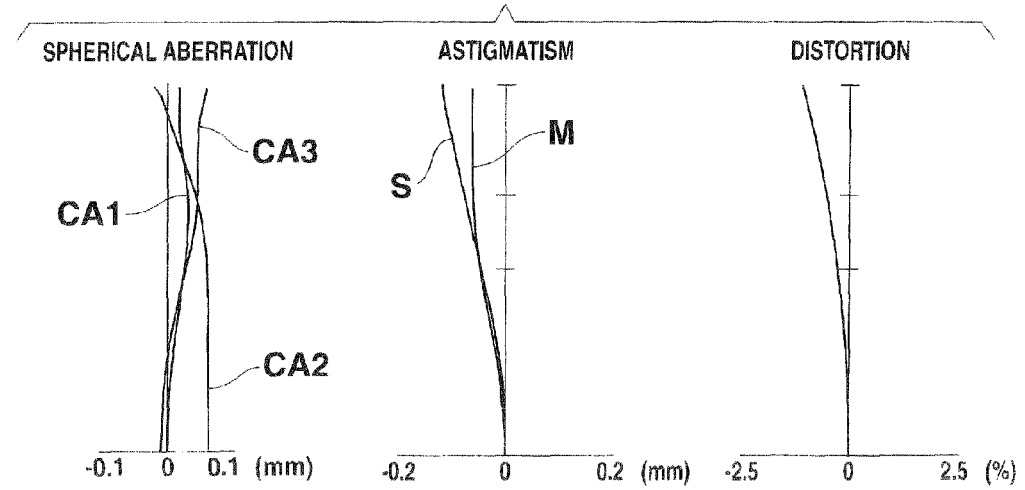

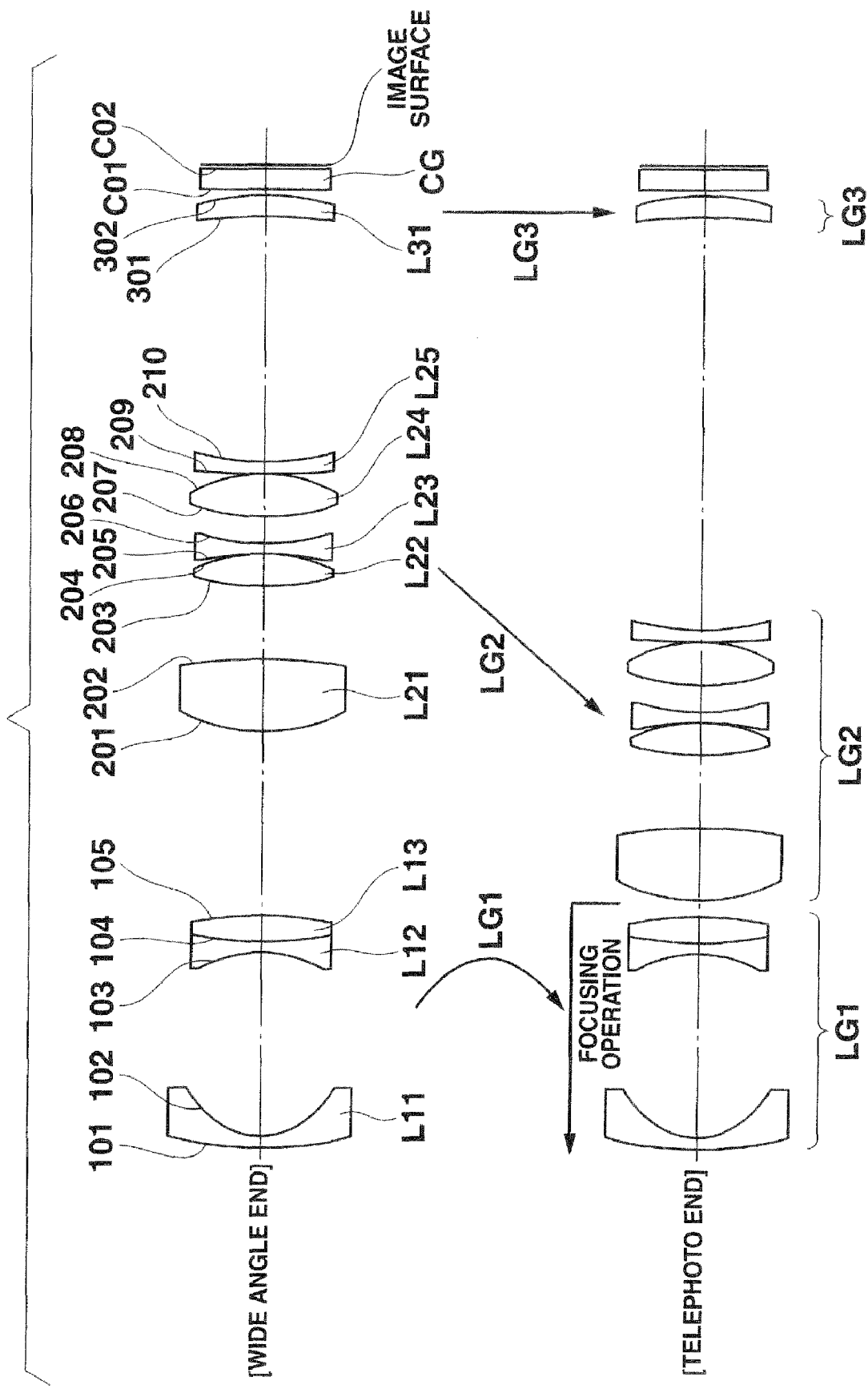

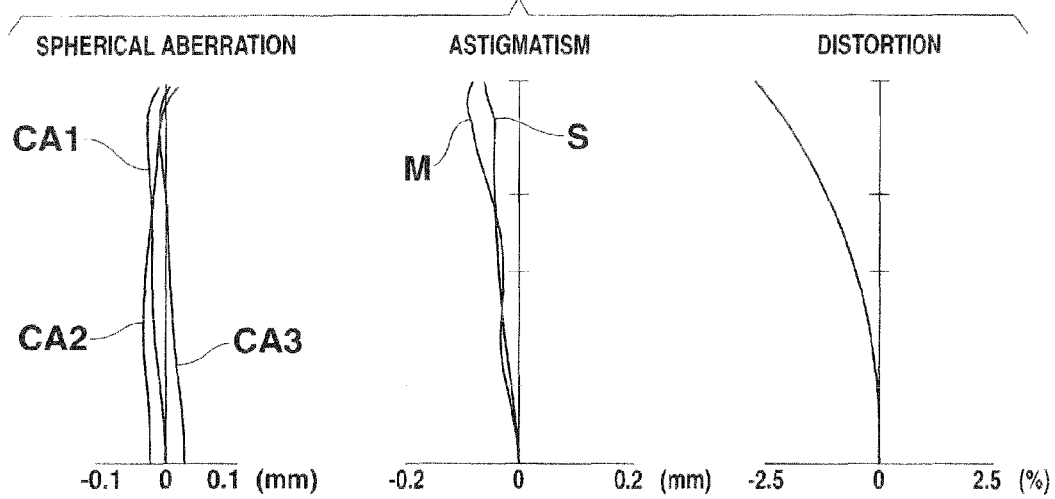
FIG.4A (EMBOD.2: WIDE ANGLE END)
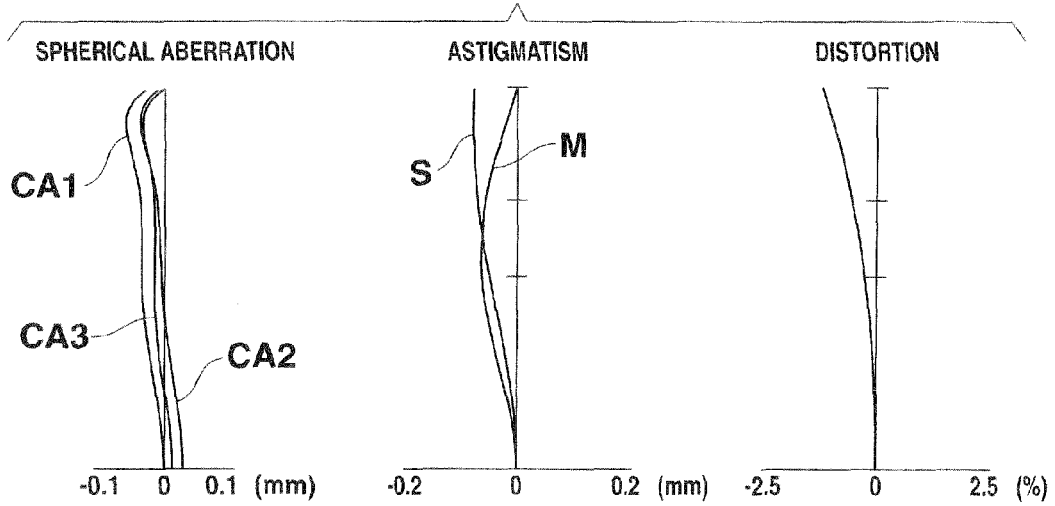
FIG.4B (EMBOD.2: INTERMEDIATE AREA)
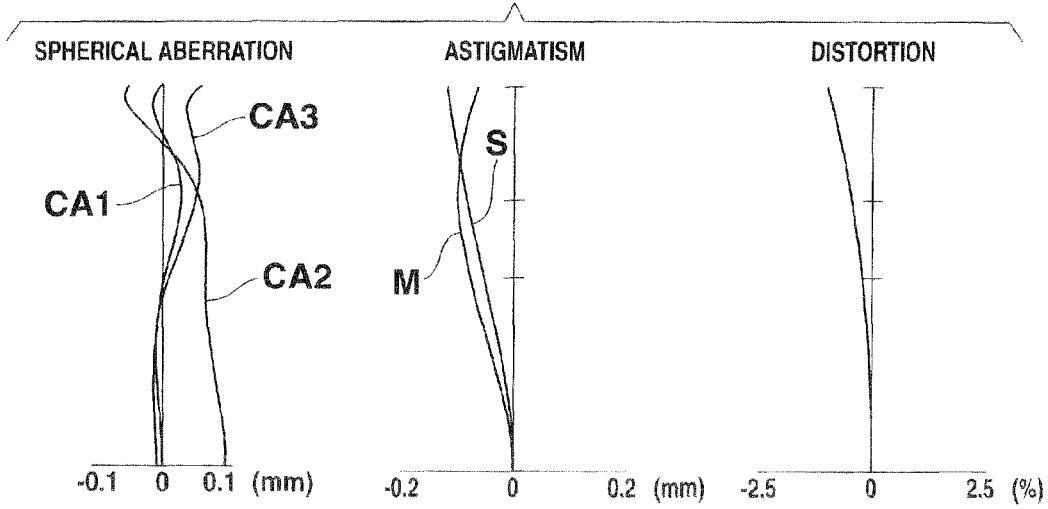
FIG.4C (EMBOD.2: TELEPHOTO END)

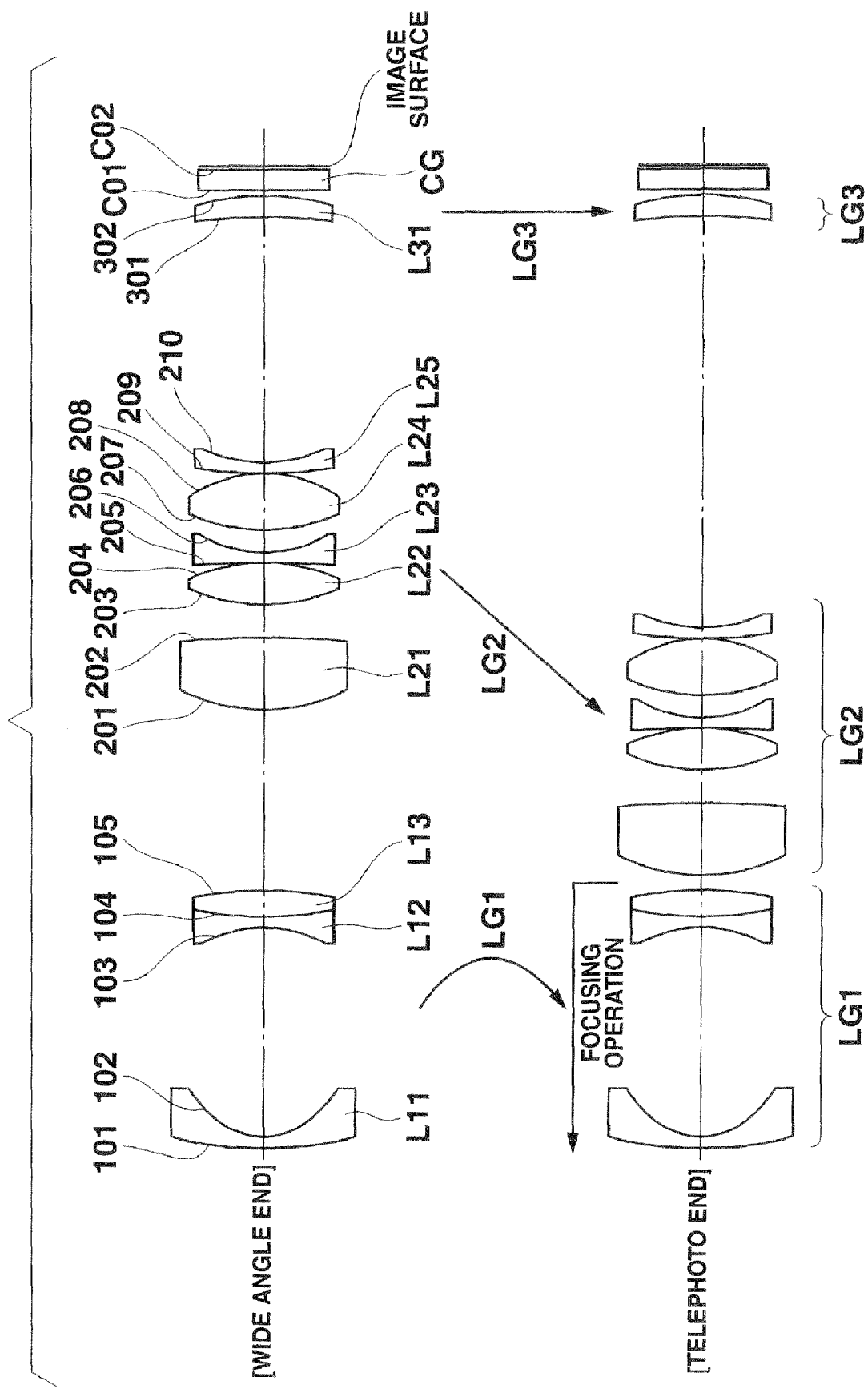
FIG.5 (EMBOD.3)

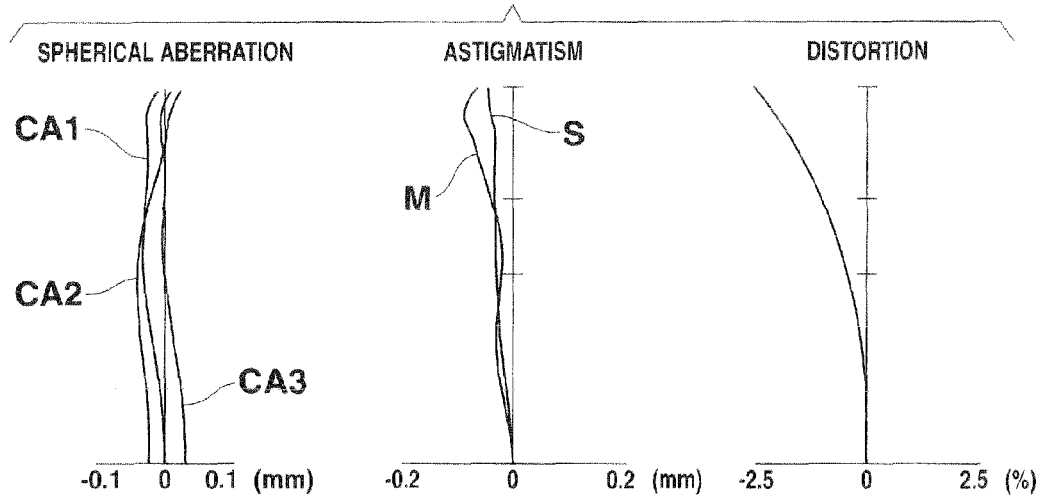
FIG.6A (EMBOD.3: WIDE ANGLE END)
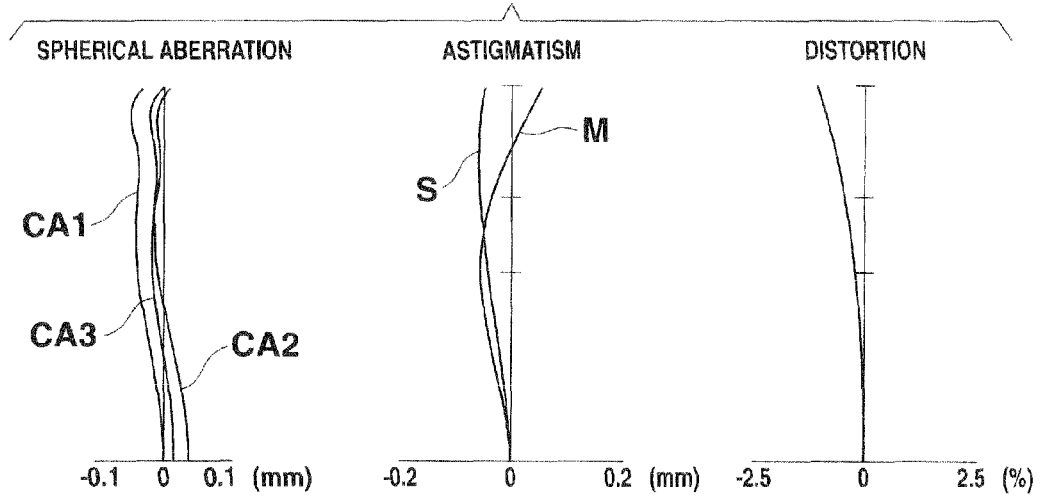
FIG.6B (EMBOD.3: INTERMEDIATE AREA)
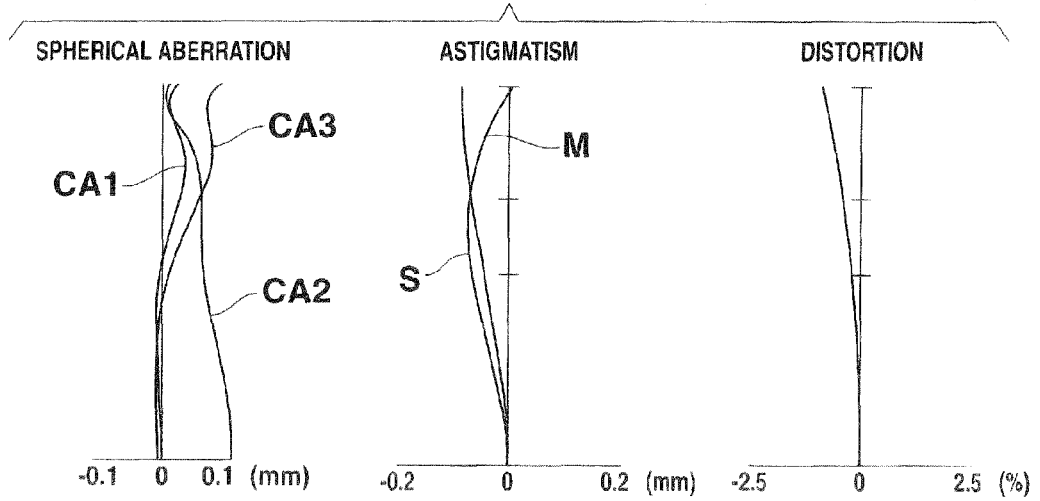
FIG.6C (EMBOD.3: TELEPHOTO END)

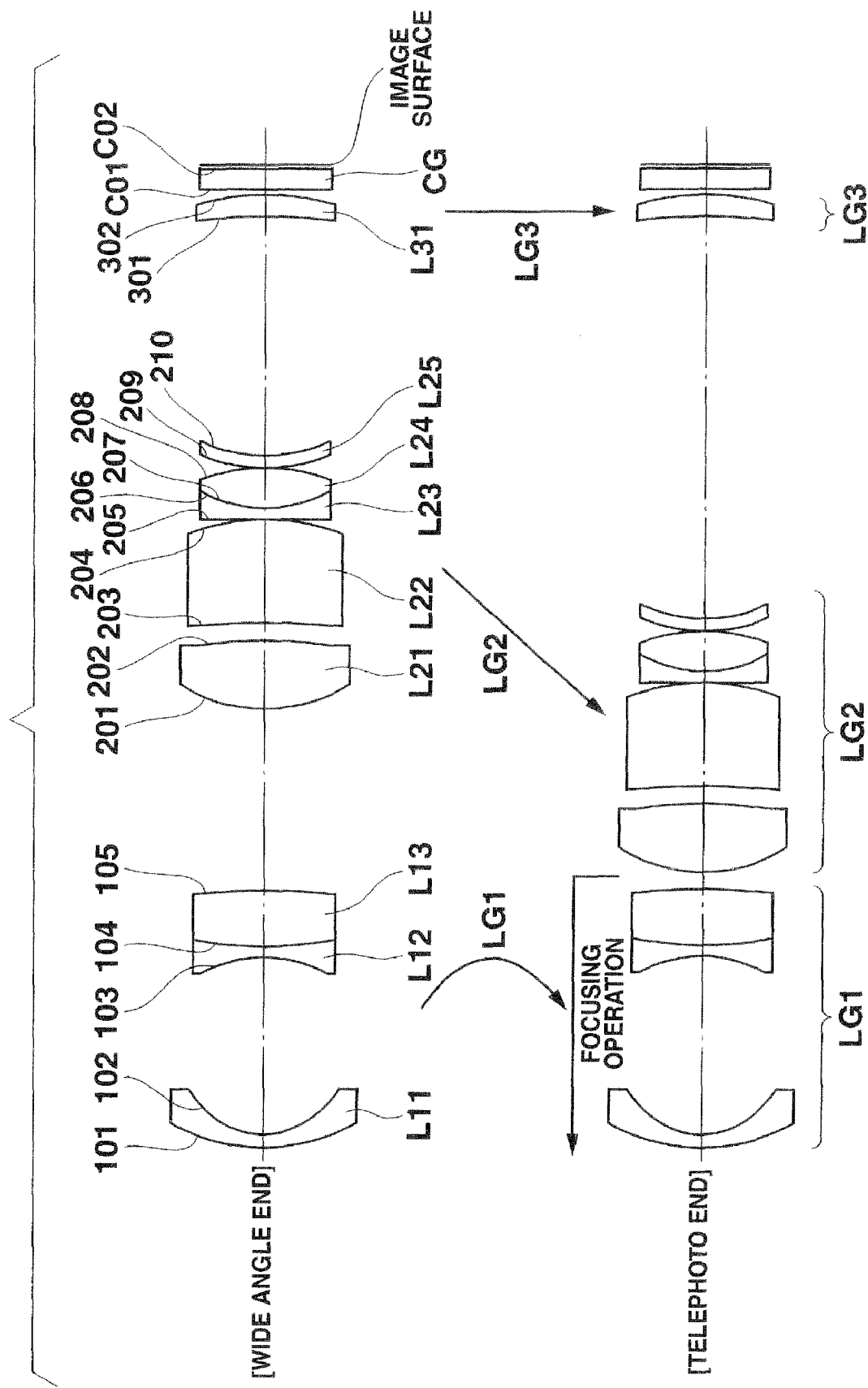

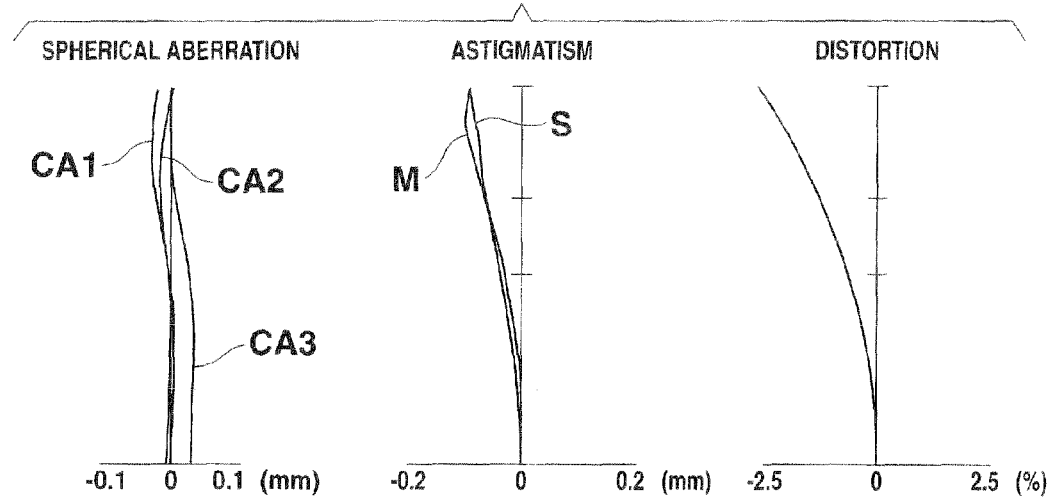
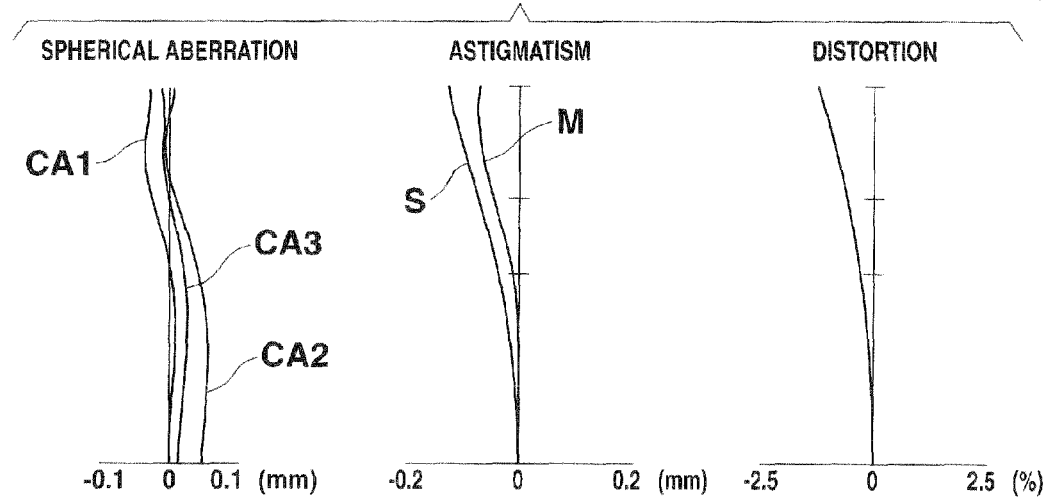
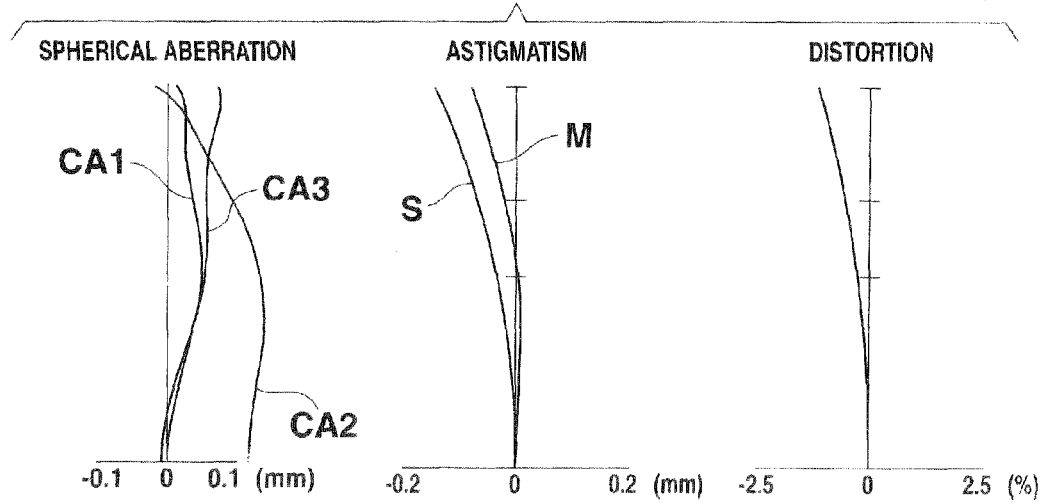

ZOOM LENS SYSTEM AND A PROJECTOR WITH THE ZOOM LENS SYSTEM

CROSS REFERENCE TO RELATED APPLICATIONS

This application is based upon and claims the benefit of priority from the prior Japanese Patent Application No. 2008-215019, filed Aug. 25, 2008, the entire contents of which are incorporated herein by reference.

BACKGROUND OF THE INVENTION

1. Field of the Invention

The present invention relates to zoom lens systems and more particularly to a compact zoom lens system with a small aperture which projects on a screen or the like in an enlarged manner an image formed by changing a reflective direction of light from a light source such as a DMD.

2. Description of the Related Art

A projector that employs a DMD as a light bulb has been considered as advantageous to projectors of other types in terms of miniaturization. At present, portable compact projectors have spread widely, including a data projector convenient for presentation. It is important to reduce the thickness of a projector intended for portability, especially so if it is carried around often along with a notebook computer.

In order to solve this problem, JP 2004-271668, for example, discloses a method of designing a compact projection lens. In this example, when a 0.7 inch DMD is used, the effective aperture of the foremost lens of the zoom lens system is in the range of 39-42 mm and at least the thickness of the projector, however, cannot be reduced beyond 50 mm. This thickness is not sufficiently satisfactory when the projector is actually carried around, for example, along with a notebook personal computer.

It is therefore an object of the present invention to provide a compact small-aperture lens system which is suitable for the characteristics of a light bulb which changes a reflective direction of light from a light bulb such as the DMD, thereby forming an image, and which has high imageability of an enlarged image projected from the light bulb on a screen or a wall. Another object of the present is to provide a thin, portable, compact, light, high-quality projector which is capable of projecting a large image even in a limited space such as a small meeting room.

SUMMARY OF THE INVENTION

In order to achieve the above objects, one aspect of the present invention provides a zoom lens system comprising, arranged sequentially from the enlarging side to the reducing side, a first lens group having a negative refractive power as a whole and including, arranged sequentially from the enlarging side to the reducing side, a lens having a negative refractive power and of meniscus convex toward the enlarging side, a lens having a negative refractive power and a lens having a positive refractive power; a second lens group having a positive refractive power as a whole and including, arranged sequentially from the enlarging side to the reducing side, a lens having a positive refractive power, a second lens having a positive refractive power, a lens having a negative refractive power, a biconvex lens having a positive refractive power and a lens having a negative refractive power and of meniscus convex toward the enlarging side; and a third lens group having a positive refractive power as a whole and including a single lens having a positive refractive power.

The first lens group is adapted to move along an optical axis from the enlarging side to the reducing side during zooming from the wide angle end to the intermediate area, and also move along the optical axis from the reducing side to the enlarging side during zooming from the intermediate area to the telephoto end. The second lens group is adapted to move along the optical axis from the reducing side to the enlarging side during zooming from the wide angle end to the telephoto end with the third lens group fixed during the zooming operation.

The distance on the optical axis between a focused position and the enlarging side face of the lens of the first lens group disposed on the most enlarging side at the wide angle end satisfies a conditional expression (1) below. A positional relationship between the second and third lens groups at the wide angle end satisfies a conditional expression (2) below. The magnification of the second lens group at the wide angle end satisfies a conditional expression (3) below. The refractive power of the first lens group satisfies a conditional expression (4); and the magnification of the second lens group at the telephoto end satisfies a conditional expression (5) below.

$$7.0 < TL/f_w < 10.0 \tag{1}$$

$$1.8 < d_{IIw}/f_w < 2.5 \tag{2}$$

$$-1.0 < m_{IIw} < -0.5 \tag{3}$$

$$-1.0 < f_w/f_1 < -0.55 \tag{4}$$

$$1.4 < m_{IIT}/m_{IIw} < 2.8 \tag{5}$$

where TL is the distance on the optical axis between the focused position and the enlarging side face of the first lens from the enlarging side of the first lens group at the wide angle end (in a focused state where the distance between the most enlarging side face of the first lens group and a subject which the most enlarging side face of the first lens group faces is 1700 mm);

$f_w$ is a composite focused distance of the whole lens system at the wide angle end (in the above-mentioned focused state);

$d_{IIw}$ is a gap between the second and third lens groups at the wide angle end;

$f_1$ is a composite focused distance of the first lens group at the wide angle end;

$m_{IIw}$ is the magnification of the second lens group at the wide angle end; and $m_{IIT}$ is the magnification of the second lens group at the telephoto end.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a schematic of a zoom lens system as an embodiment 1 of the present invention.

FIG. 2 illustrates several aberrations occurring in the zoom lens of the embodiment 1.

FIG. 3 is a schematic of a zoom lens system as an embodiment 2 of the present invention.

FIG. 4 illustrates several aberrations occurring in the zoom lens of the embodiment 2.

FIG. 5 is a schematic of a zoom lens system as an embodiment 3 of the present invention.

FIG. 6 illustrates several aberrations occurring in the zoom lens system of the embodiment 3.

FIG. 7 is a schematic of a zoom lens system as an embodiment 4 of the present invention.

FIG. 8 illustrates several aberrations occurring in the zoom lens system of an embodiment 4.

DETAILED DESCRIPTION OF THE PREFERRED EMBODIMENTS

Figure 9:
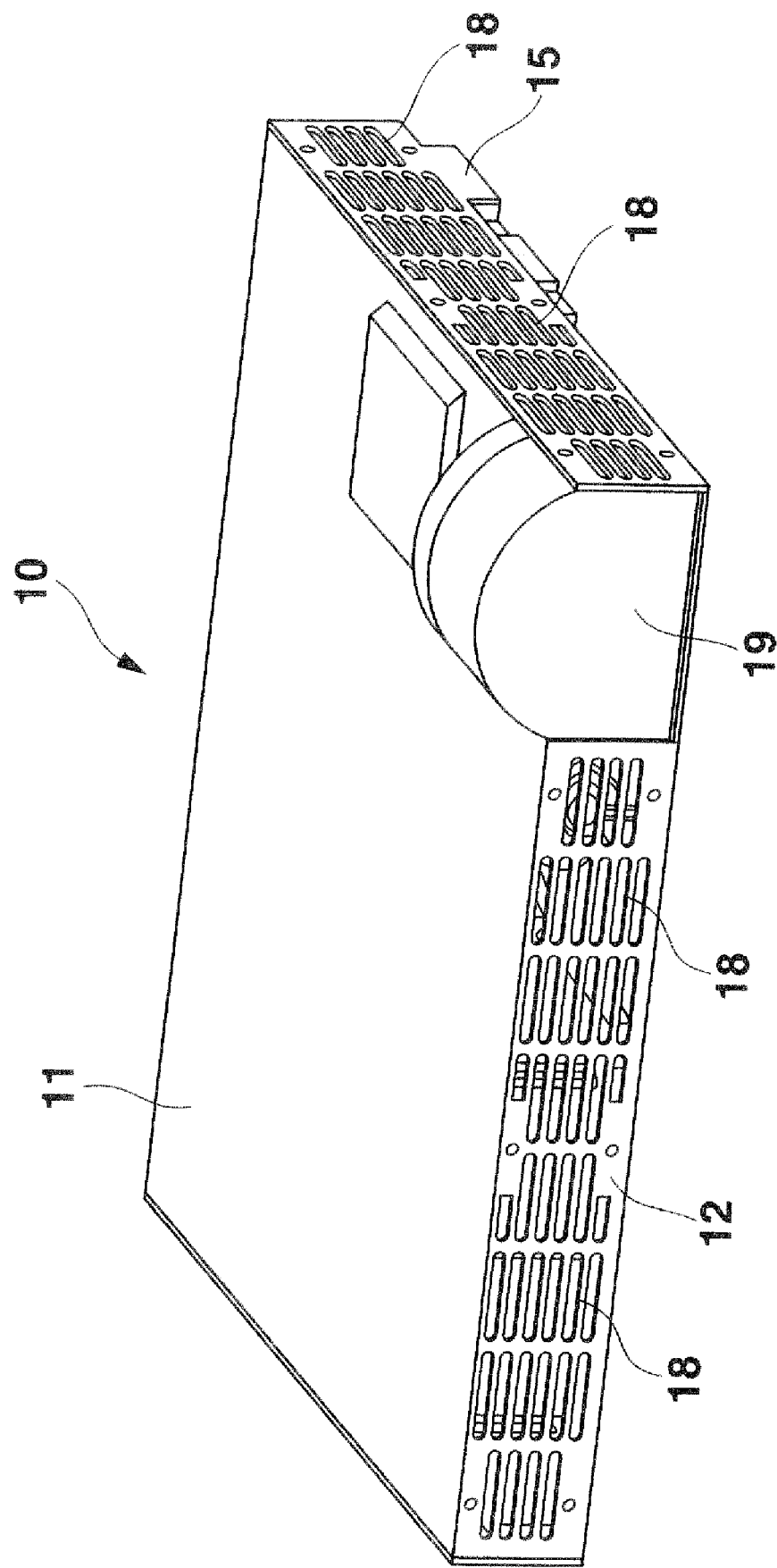
FIG. 9 is a perspective view of a projector using the compact zoom lens system according to the present invention.

Now, preferred embodiments of the present invention will be described. Referring to FIGS. 1, 3, 5 and 7, the embodiments 1, 2, 3 and 4 of the zoom lens system of the present invention will be described. Each of the zoom lens systems of the embodiments 1-4 includes, arranged sequentially from the enlarging side to the reducing side, a lens group LG1 having a negative refractive power as a whole, a lens group LG2 having a negative refractive power as a whole, and a lens group LG3 having a positive refractive power as a whole. In this description, lenses having positive and negative refractive powers are hereinafter referred to as positive and negative lenses, respectively.

The first lens group LG1 includes, arranged sequentially from the enlarging side to the reducing side, a negative lens L11 with enlarging and reducing side faces 101 and 102 of meniscus shape convex toward the enlarged side, a negative lens L12 with enlarging and reducing side faces 103 and 104, and a positive lens L13 with enlarging and reducing side faces 104 and 105.

The second lens group LG2 includes, arranged sequentially from the enlarging side to the reducing side, a positive lens L21 with enlarging and reducing side faces 201 and 202, a positive lens L22 with enlarging and reducing side faces 203 and 204, a negative lens L23 with enlarging and reducing side faces 205 and 206, a positive L24 with enlarging and reducing side faces 207 and 208, and a negative lens L25 with enlarging and reducing side faces 209 and 210.

The third lens group LG3 includes a single positive lens L31 with enlarging and reducing side faces 301 and 302. A glass cover CG with enlarging and reducing side faces C01 and C02, which cover is a component of the light bulb, is provided slightly spaced from the reducing side face of the third lens group LG3.

The third group LG3 is fixed during zooming. The first lens group LG1 is adapted to move along an optical axis from the enlarging side to the reducing side during zooming from the wide angle end the intermediate area. The first lens group LG1 also is adapted to move along the optical axis from the reducing side to the enlarging side during zooming the intermediate area to the telephoto end. The second lens group LG2 is adapted to move along the optical axis from the reducing side to the enlarging side during zooming from the wide angle end to the telephoto end. Thus, the zoom lens system performs its zooming operation.

As well known, an aspherical surface of each lens of the zoom lens system used in the respective embodiment is formed so as to coincide with an aspherical surface obtained by substituting respective desired specified values into constants; i.e., a paraxial radius of curvature r, a conical constant K, and aspherical surface coefficients of high order A, B, C, D, ... included in an expression:

$$Z = (Y^2/r)/[1+\sqrt{\{1-(1+K)(Y/r)^2\}}] + A \cdot Y^4 + B \cdot Y^6 + C \cdot Y^8 + D \cdot Y^{10} + \ldots$$

and then by rotating a graph indicative of the expression around the optical axis where Z and Y axes are set so as to coincide with the optical axis and to be perpendicular to the optical axis, respectively.

In the notation of the conical constants K and aspherical coefficients A-D of high order included in Tables 1-4 indicated later, each of the conical and aspherical coefficients K and A-D includes a notation part "e+$n_1 n_2$" or "e−$n_1 n_2$", which implies "×10$^{+n_1 n_2}$" or "×10$^{-n_1 n_2}$", where each of $n_1$ and $n_2$ is a figure. For example, in Table 1, a notation "−5.70111e−01" given as a conical constant K for the face 102 of the lens L11 of the first lens group implies "−5.70111×10$^{-01}$" (=−5.70111×10).

As described above, each of the zoom lens system of the embodiments 1-4 includes, arranged sequentially from the enlarging side to the reducing side, the first lens group having the negative refractive power as a whole and including, arranged sequentially from the enlarging side to the reducing side, the negative lens of meniscus convex toward the enlarging side, the negative lens and the positive lens; the second lens group having the positive refractive power as a whole and including, arranged sequentially from the enlarging side to the reducing side, the positive lens, the second positive lens, the negative lens, the biconvex positive lens and the negative lens of meniscus convex toward the enlarging side; and the third lens group having the positive refractive power as a whole and including the single positive lens.

As described above, the first lens group is adapted to move along the optical axis from the enlarging side to the reducing side during zooming from the wide angle end to the intermediate area. The first lens group also is adapted to move along the optical axis from the reducing side to the enlarging side during zooming from the intermediate area to the telephoto end. The second lens group is adapted to move along the optical axis from the reducing side to the enlarging side during zooming from the wide angle end to the telephoto end. The third group LG3 is adapted to be fixed during the zooming.

The distance on the optical axis between a focused position and the enlarging side face of the lens disposed on the most enlarging side of the first lens group at the wide angle end is required to satisfy a conditional expression (1) below.

A positional relationship between the second and third lens groups at the wide angle end is required to satisfy a conditional expression (2) below. The magnification of the second lens group at the wide angle end is required to satisfy a conditional expression (3) below.

The refractive power of the first lens group is required to satisfy a conditional expression (4). The magnification of the second lens group at the telephoto end is required to satisfy a conditional expression (5) below.

$$7.0 < TL/f_w < 10.0 \tag{1}$$

$$1.8 < d_{IIw}/f_w < 2.5 \tag{2}$$

$$-1.0 < m_{IIw} < -0.5 \tag{3}$$

$$-1.0 < f_w/f_1 < -0.55 \tag{4}$$

$$1.4 < m_{IIT}/m_{IIw} < 2.8 \tag{5}$$

where TL is the distance on the optical axis between the focused position and the enlarging side face of the lens disposed on the most enlarging side of the first lens group at the wide angle end (in a focused state where the distance between the most enlarging side face of the first lens group and a subject which the most enlarging side faces is 1700 mm);

$f_w$ is a composite focused distance of the whole lens system at the wide angle end (in the same focused state as mentioned above);

$d_{IIw}$ is a gap between the second and third lens groups at the wide angle end;

$f_1$ is a composite focused distance of the first lens group at the wide angle end (in the same focused state as mentioned above);

$m_{IIw}$ is the magnification of the second lens group at the wide angle end; and $m_{IIT}$ is the magnification of the second lens group at the telephoto end.

As described above, the conditional expression (1) indicates a condition for the distance between the focused position and the enlarging side face of the lens disposed on the most enlarging side of the first lens group at the wide angle end. It is also a condition for miniaturization of the size and aperture of the whole zoom lens system.

If the upper limit of the conditional expression (1) is exceeded, the distance between the focused position and the enlarging side face of the lens disposed on the most enlarging side of the first lens group at the wide angle end would increase excessively and the lens aperture also would increase excessively, thereby spoiling miniaturization of the size and aperture of the whole zoom lens system. If the lower limit of the conditional expression (1) is exceeded, it would be difficult to obtain a good balance among various aberrations.

As described above, the conditional expression (2) involves a gap between the second and third lens groups at the wide angle end in which an illuminator of the light bulb should be disposed. If the upper limit of the conditional expression (2) is exceeded, the gap for the illuminator could be secured, but the size of the lens system would be larger. If the lower limit of the conditional expression (2) is exceeded, the gap for the illuminator would be insufficient and design would be difficult.

The conditional expression (3) involves a range of magnification of the second lens group and a condition for miniaturizing the whole zoom lens system over the zooming area. If the lower limit of the conditional expression (3) is exceeded, the overall length of the zoom lens system would increase in a reduced magnification. If the upper limit of the condition (3) is exceeded, the overall length of the lens system would increase in an enlarged magnification.

The conditional expression (4) involves a condition for the refractive power of the first lens group. The first lens group has a strong negative refractive power and secures the gap between the second and third lens groups where the optical system which illumines the light bulb or the DMD should be disposed.

If the upper limit of f the conditional expression (4) is exceeded, the negative refractive power of the first lens group would decrease and it would be difficult to secure the gap for the optical system between the second and third lens groups. If the lower limit of the conditional expression (4) is exceeded, the negative refractive power of the first lens group would increase, which requires to increase the positive refractive power of the second lens group and makes it impossible to obtain a good balance among various aberrations.

The conditional expression (5) involves a condition for the magnifications of the second lens group at the wide angle and telephoto ends and corresponds to a range of variable magnification of the zoom lens system.

If the upper limit of the conditional expression (5) is exceeded, a lens system of a large zooming magnification would be obtained, but a movement quantity of the second lens group would increase, thereby increasing the size and performance variation of the zoom lens system excessively. If the lower limit of the conditional expression (5) is exceeded, the zoom lens system would be advantageous with respect to performance, but its zooming magnification would decrease excessively. Thus, a small and high zooming power lens according to the present invention would not be obtained.

Further, preferably, the dimensions of the first lens group along the optical axis are required to satisfy a conditional expression (6) below: the refractive power of the lens disposed on the most enlarging side of the first lens group is required to satisfy a conditional expression (7) below; the shape of the reducing side face of the lens disposed on the most enlarging side of the first lens group satisfies a conditional expression (8) below; and the dispersive characteristics of an optical glass material of the respective lenses of the first lens group are required to satisfy a conditional expression (9) below:

$$1.7 < L_1/f_w < 2.7 \quad (6)$$

$$-0.8 < f_w/f_1 < -0.3 \quad (7)$$

$$0.9 < f_w/r_2 < 1.6 \quad (8)$$

$$25 < (V_1+V_2)/2 - V_3 \quad (9)$$

where $L_1$ is a distance along the optical axis between the enlarging side face of the lens disposed on the most enlarging side of the first lens group and the reducing side face of the lens disposed on the most reducing side of the first lens group;

$f_1$ is the focal distance of the lens disposed on the most enlarging side of the first lens group;

$r_2$ is a radius of curvature of the reducing side face of the lens disposed on the most enlarging side of the first lens group;

$V_1$ is an Abbe's number of the negative lens disposed on the most enlarging side of the first lens group;

$V_2$ is an Abbe's number of the negative lens disposed on the reducing side of the first lens group; and $V_3$ is an Abbe's number of the positive lens disposed on the most reducing side of the first lens group.

As described above, the conditional expression (6) involves the dimensions of the first lens group on the optical axis, and more particularly a condition for correcting various aberrations with a small number of lenses. In order to increase as mush as possible a distance corresponding to a back focus between the second and third lens groups, it is especially effective to increase the negative refractive power of the lens disposed on the most enlarging side of the first lens group.

If the negative refractive power increases excessively, however, it would be difficult to correct various aberrations. When this problem is solved either by increasing the overall length of the first lens group along the optical axis or by increasing the number of lenses of the first lens group to disperse the negative refractive power of the first lens group, the first lens group cannot help lengthen necessarily to some extent.

If the upper limit of the conditional expression (6) is exceeded, the dimensions of the first lens group along the optical axis would increase excessively, thereby satisfying no specifications and making the miniaturization senseless. If the lower limit of the conditional expression (6) is exceeded, it would be difficult to reduce the aperture of the lens system.

As described above, the conditional expression (7) involves a condition for the refractive power of the lens disposed on the most enlarging side of the first lens group, and an increase in the negative refractive power of this lens is effective to secure the gap for the light bulb between the second and third lens groups at the wide angle end and to miniaturize the lens system. However, if the upper limit of the conditional expression (7) is exceeded, the negative refractive power of the lens would increase, thereby producing chromatic aberrations and a curvature of field, which are difficult to correct.

If the lower limit of the conditional expression (7) is exceeded, the negative refractive power of the lens decreases, thereby making it difficult to increase a distance corresponding to the back focus between the second and third lens groups.

The conditional expression (8) involves correction of a distortion and comatic aberration of the whole lens system. The reducing side face shape of the lens disposed on the most enlarging side of the first lens group has a strong refractive power and is substantially concentric with a light beam coming from the enlarging side so as to suppress occurrence of aberrations basically.

Thus, if the upper limit of the conditional expression (8) is exceeded, the spherical and comatic aberrations would be undercorrected. If the lower limit of the conditional expression (8) is exceeded, those aberrations would, on the contrary, be overcorrected.

The conditional expression (9) involves a condition for correcting chromatic aberrations of the first lens group. In order to correct the monochromatic aberrations, it is necessary to keep the refractive power of the respective lenses from being excessively large. To this end, the Abbe's numbers of the positive and negative lenses are required to satisfy the conditional expression (9). When the lower limit of the conditional expression (9) is exceed, the color aberrations are difficult to correct.

The focusing operation is preferably achieved by moving the first lens group along the optical axis. The lens disposed on the most enlarging side of the first lens group preferably has an aspherical reducing side face.

As described above, the reducing side face shape of the lens disposed on the most enlarging side of the first lens group contributes greatly to correction of the distortion and comatic aberrations. If this face is spherical, it is difficult to correct various aberrations including a curvature of field. However, by making the lens face aspherical, those aberrations are corrected.

As described above, preferably, the second lens group includes, arranged sequentially from the enlarging side, the positive lens, the second positive lens, the negative lens, the biconvex lens and the negative lens of meniscus convex toward the enlarging side; the composite refractive power of the combination of the two positive lenses arranged on the enlarging side of the second lens group preferably satisfies a conditional expression (10) below; and the third negative lens of the second lens group is preferably required to satisfy a conditional expression (11) below.

Preferably, the dispersive characteristic of an optical glass material of the three lenses arranged on the enlarging side of the second lens group is required to satisfy a conditional expression (12) below; the dispersive characteristic of an optical glass material of the fourth lens of the second lens group is required to satisfy a conditional expression (13) below; then, the enlarging side face shape of the lens disposed on the most enlarging side of the second lens group, and the reducing side face shape of the second lens of the second lens group are required to satisfy a conditional expression (14) below:

$$-0.7 < f_w/f_6 < 0.8 \quad (10)$$

$$0.4 < f_w/f_{4\text{-}5} < -0.4 \quad (11)$$

$$30 < (V_5 + V_7)/2 - V_6 \quad (12)$$

$$69 < V_7 \quad (13)$$

$$-1.2 < r_{II1}/r_{II4} < -0.5 \quad (14)$$

where $f_{4\text{-}5}$ is a composite focal distance of the combination of the two positive lenses disposed on the enlarging side of the second lens group;

$f_6$ is a focal distance of the third negative lens disposed on the enlarging side of the second lens group;

$V_5$ is an Abbe's number of the second lens having a positive refractive power from the enlarging side of the second lens group;

$V_6$ is an Abbe's number of the third lens having a negative refractive power from the enlarging side of the second lens group;

$V_7$ is an Abbe's number of the fourth lens having a positive refractive power from the enlarging side of the second lens group;

$r_{II1}$: is a radius of curvature of the enlarging side face of the lens disposed on the most enlarging side of the second lens group; and $r_{II4}$: is a radius of curvature of the reducing side face of the second lens from the enlarging side of the second lens group.

As described above, the conditional expression (10) involves the refractive power of the two positive lenses disposed on the enlarging side of the second lens group. These two positive lens are required to have a strong positive refractive power to lead a divergent beam emanated from the first lens group to a focused state, which would produce large spherical and chromatic aberrations.

The use of a single positive lens would produce large aberration which is difficult to correct. Thus, the two positive lenses are used to divide the refractive power so as to allow to correct respective aberrations. If the upper limit of the expression (10) is exceeded, the composite refractive power of the combination of the two positive lens and the undercorrected spherical aberration would increase excessively. If the lower limit of the expression (10) is exceeded, the composite refractive power of the two positive lenses would decrease, thereby bringing about excessively large overcorrected spherical aberrations, which are difficult to correct.

The conditional expression (11) involves a condition for correcting aberrations, which would be produced by the two positive lenses disposed on the enlarging side of the second lens group, in a well-balanced manner with the third lens of the second lens group having a strong negative refractive power. If the upper limit of the conditional expression (11) is exceeded, an overcorrected spherical aberration would be increase. If the lower limit of the expression (11) is exceeded, an undercorrected spherical aberration would increase, and be difficult to correct.

The conditional expression (12) involves a condition for correcting chromatic aberrations in the second lens group. In order to correct the chromatic aberrations, the refractive power of the respective lenses is required not to increase excessively. To this end, the Abbe's numbers of the positive and negative lenses are required to satisfy the conditional expression (12). If the lower limit of the conditional expression (12) is exceeded, the chromatic aberrations would be difficult to correct.

The conditional expression (13) involves a condition for correcting magnification chromatic aberrations. Since the second lens group has the strong positive refractive power, it greatly influences the magnification chromatic aberrations. Especially, the third positive lens of the second lens group having the strongest positive refractive power influences the aberrations most. If the lower limit of the conditional expression (13) is exceeded, the aberrations would be difficult to correct.

The conditional expression (14) involves the shape of the first and second positive lenses disposed on the enlarging side of the second lens group for dispersing refractive power to those positive lenses in a well-balanced manner, thereby correcting the spherical and comatic aberrations. If the upper limit of the conditional expression (14) is exceeded, a large overcorrected spherical aberration would be produced, thereby producing a large comatic aberration around the periphery of a projected image. If the lower limit of the conditional expression (14) is exceeded, a large undercorrected spherical aberration would be produced and difficult to correct.

Preferably, the enlarging side face of the lens disposed on the most enlarging side of the second lens group is aspherical; a refractive power set to the aspherical face is required to satisfy a conditional expression (15) below; and a refractive power set to the reducing side face of the lens disposed on the most reducing side of the second lens group is required to satisfy a conditional expression (16) below:

$$0.4 < f_w/r_{III} < 0.7 \tag{15}$$

$$0.3 < f_w/r_{III0} < 0.8 \tag{16}$$

where $r_{III0}$ is a radius of curvature of the reducing side face of the lens disposed on the most reducing side of the second lens group.

The conditional expression (15) involves a condition for correcting a dispersive light beam emanated from the first lens group, securing a large aperture ratio, and correcting spherical and comatic aberrations. The shape of the enlarging side face of the lens disposed on the most enlarging side of the second lens group has a strong positive refractive power to bring the optical beam emanated from the first lens group to a focused state, thereby producing a large undercorrected spherical aberration.

As described above, the second and following lenses of the second lens group correct the spherical and comatic aberrations concerned. If the upper limit of the conditional expression (15) is exceeded, an undercorrected spherical aberration would increase. If the lower limit of the conditional expression (15) is exceeded, an overcorrected spherical aberration would increase. Thus, a large comatic aberration would be produced around the periphery of a projected image, and difficult to correct.

If the lens disposed on the most enlarging side of the second lens group has a face shape of strong positive refractive power, an undercorrected aberration can occur because of shape restrictions of the lens. Thus, the face of that lens is worked so as to be aspherical, thereby securing a large aperture ratio of the whole lens system, which reduces the diameter of the whole lens system and corrects the spherical aberrations.

The conditional expression (16) involves a condition to minutely correct spherical and comatic aberrations of the whole lens system especially remaining without being corrected by the four (or first-fourth) lenses disposed on the enlarging side of the second lens group. If the upper limit of the conditional expression (16) is exceeded, an undercorrected aberration would occur. If the lower limit of the conditional expression (16) is exceeded, an overcorrected aberration would occur.

As described above, the whole projector is reduced in size and thickness by mounting the compact zoom lens according to the present invention on the projector device, and is convenient to carry around. Further, according to the present invention, there are provided a compact zoom lens of high imageability suitable for the characteristic of a light bulb such as the DMD and hence a compact, light, high-quality projector.

Referring to FIG. 9, the projector with the inventive lens system is shown. The projector 10 is in substantially the form of a cuboid which includes a lens cover 19 which covers a projection port provided at a right-hand end of a front 12 thereof. The front 12, the right-hand side 15 and the left-hand side (not shown) of the housing are made of a cover with numerous slits 18 for ventilation.

Although not shown in FIG. 9, a key/indicator section is provided on the top 11 of the housing, which section includes keys and indicators such as a refractive power switch key, a power indicator which reports the turning on/off of a power source, a switch for lighting a lamp of the light source and a lamp indicator which indicates the lighting of the lamp, and an overheat indicator which reports overheating of the light source or other devices.

Likewise, although not shown in FIG. 9, the housing has on its back an input/output connector with USB terminals, D-SUB, S and RCA terminals for receiving image signals; a power source adaptor plug; and an Ir receiver which receives control signals from a remote controller.

Embodiment 1

Table 1 given in the annex shows a numerical example of the embodiment 1 of the inventive zoom lens system. FIGS. 1 and 2 show a lens system schematic and its various aberrations, respectively. In Table 1 and FIGS. 1 and 2, f is a focal distance of the whole zoom lens system; $F_{no}$ is an F number of the zoom lens system; 2ω is the whole angle of view of the zoom lens system; r is a radius of curvature of the zoom lens system; d is the thickness or interval of each lens of the zoom lens system; $n_d$ is a refractive index of the zoom lens system for a D line; $v_d$ is an Abbe's number of that lens for the D line (In Table 1, numerical values changing due to the focusing operation are obtained in a focused state where the distance between the subject and the enlarging side face 101 of the lens L11 of the first lens group is 1700 mm).

Reference characters CA1, CA2 and CA3 used in FIGS. 2, 4, 6 and 8 denote spherical aberration curves obtained at wavelengths of 550.0, 450.0 and 620.0 nm, respectively. Reference characters S and M used in "astigmatism" sections of FIGS. 2, 4, 6 and 8 denote sajittal and meriodinal aberration curves, respectively. The wavelength of 550.0 nm was used to calculate various numerical values unless otherwise specified in the description.

Embodiment 2

An example of numeral values used in the embodiment 2 of the zoom lens system of the invention is shown in Table 2 given in the annex. FIGS. 3 and 4 show a schematic of the zoom lens system and its various aberrations, respectively.

Embodiment 3

An example of numeral values used in the embodiment 3 of the zoom lens system of the invention is shown in Table 3 given in the annex. FIGS. 5 and 6 show a schematic of the lens system and its various aberrations, respectively.

Embodiment 4

An example of numeral values used in the embodiment 4 of the zoom lens system of the invention is shown in Table 4 given in the annex. FIGS. 7 and 8 show a schematic of the zoom lens system and its various aberrations, respectively.

Values corresponding to the conditional expressions (1)-(16) for the embodiments 1-4 are shown collectively in Table 5 given in the annex.

As will be obvious from Table 5, the numeral values on the respective embodiments 1-4 satisfy the conditional expressions (1)-(16). Also, as will be obvious from Figures involving the aberrations for the respective embodiments, the aberrations are corrected well.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

TABLE 1

|  | Wide angle End | Intermediate area | Telephoto End |
|---|---|---|---|
| f | 15.97 | 23.92 | 30.96 |
| $F_{no}$ | 2.29 | 2.90 | 3.45 |
| 2ω | 65.83 | 46.21 | 36.44 |

| Gap changing depending on Zooming | | | |
|---|---|---|---|
| D5 | 28.14 | 11.61 | 4.08 |
| D13 | 34.00 | 46.79 | 58.11 |

| Serial No. | Face No. | r | d | $n_d$ | $v_d$ |
|---|---|---|---|---|---|
| 1 | 101 | 48.329 | 1.50 | 1.69400 | 56.30 |
| 2 | 102 | 13.716 | 28.99 | — | — |
| 3 | 103 | −25.142 | 2.59 | 1.49700 | 81.61 |
| 4 | 104 | 68.816 | 3.58 | 1.83400 | 37.34 |
| 5 | 105 | −90.056 | [D5] | — | — |
| 6 | 201 | 31.577 | 4.78 | 1.49700 | 81.50 |
| 7 | 202 | −271.282 | 13.41 | — | — |
| 8 | 203 | 26.320 | 5.87 | 1.49700 | 81.61 |
| 9 | 204 | −46.278 | 0.10 | — | — |
| 10 | 205 | 145.373 | 1.50 | 1.81000 | 41.00 |
| 11 | 206 | 19.480 | 1.45 | — | — |
| 12 | 207 | 21.875 | 6.35 | 1.49700 | 81.61 |
| 13 | 208 | −31.986 | 0.10 | — | — |
| 12 | 209 | 782.739 | 1.50 | 1.80420 | 46.50 |
| 13 | 210 | 36.177 | [D13] | — | — |
| 14 | 301 | −100.000 | 3.00 | 1.77250 | 49.62 |
| 15 | 302 | −44.000 | 0.70 | — | — |
| 16 | C01 | ∞ | 3.00 | 1.48745 | 69.00 |
| 17 | C02 | ∞ | — | — | — |

| Conical constant and aspherical Coefficient | | |
|---|---|---|
| Face 102 | Face 201 | Face 205 |
| K = −5.70111e−01 | K = −5.32259e−01 | K = 0.00000e+00 |
| A = −5.08631e−07 | A = −4.94174e−06 | A = −2.08631e−0.5 |
| B = 1.56722e−08 | B = −6.08134e−09 | B = −5.63696e−08 |
| C = −1.17313e−10 | C = −8.96179e−12 | C = 6.66694e−11 |
| D = 3.48555e−13 | D = −3.74294e−14 | D = −1.02401e−13 |

TABLE 2

|  | Wide angle End | Intermediate area | Telephoto End |
|---|---|---|---|
| f | 16.00 | 23.92 | 31.00 |
| $F_{no}$ | 2.29 | 2.88 | 3.41 |
| 2ω | 65.84 | 46.19 | 36.37 |

TABLE 2-continued

| Gap changing depending on Zooming | | | |
|---|---|---|---|
| D5 | 25.98 | 9.76 | 2.29 |
| D13 | 34.00 | 47.02 | 58.67 |

| Serial No. | Face No. | r | d | $n_d$ | $v_d$ |
|---|---|---|---|---|---|
| 1 | 101 | 68.892 | 1.50 | 1.50915 | 56.36 |
| 2 | 102 | 11.637 | 26.06 | — | — |
| 3 | 103 | −25.041 | 1.50 | 1.49700 | 81.61 |
| 4 | 104 | 52.916 | 3.38 | 1.83400 | 37.34 |
| 5 | 105 | −104.535 | [D5] | — | — |
| 6 | 201 | 31.914 | 10.00 | 1.49700 | 81.50 |
| 7 | 202 | −91.647 | 10.30 | — | — |
| 8 | 203 | 50.827 | 4.67 | 1.49700 | 81.61 |
| 9 | 204 | −30.201 | 0.10 | — | — |
| 10 | 205 | −95.215 | 1.50 | 1.81000 | 41.00 |
| 11 | 206 | 39.813 | 3.79 | — | — |
| 12 | 207 | 49.195 | 6.37 | 1.49700 | 81.61 |
| 13 | 208 | −22.342 | 0.10 | — | — |
| 14 | 209 | 245.453 | 1.50 | 1.80400 | 37.34 |
| 15 | 210 | 40.520 | [D13] | — | — |
| 16 | 301 | −100.000 | 3.00 | 1.77250 | 49.62 |
| 17 | 302 | −44.000 | 0.70 | — | — |
| 18 | C01 | ∞ | 3.00 | 1.48745 | 69.00 |
| 19 | C02 | ∞ | — | — | — |

| Conical constant and aspherical Coefficient | | |
|---|---|---|
| Face 102 | Face 201 | Face 205 |
| K = −5.39759e−01 | K = −6.47762e−01 | K = 0.00000e+00 |
| A = −1.03665e−05 | A = −4.88303e−06 | A = −3.01004e−0.5 |
| B = 1.35316e−08 | B = −5.01082e−09 | B = −2.78125e−08 |
| C = −2.95622e−10 | C = 2.76592e−12 | C = 8.32395e−11 |
| D = 2.20763e−13 | D = −9.15622e−14 | D = −2.28360e−13 |

TABLE 3

|  | Wide angle end | Intermediate area | Telephoto end |
|---|---|---|---|
| f | 15.96 | 23.84 | 30.92 |
| $F_{no}$ | 2.29 | 2.85 | 3.35 |
| 2ω | 65.62 | 46.26 | 36.41 |

| Gap changing depending on Zooming | | | |
|---|---|---|---|
| D5 | 25.65 | 9.74 | 2.38 |
| D13 | 34.00 | 46.22 | 57.20 |

| Serial No. | Face No. | r | d | $n_d$ | $v_d$ |
|---|---|---|---|---|---|
| 1 | 101 | 89.817 | 1.50 | 1.50915 | 56.36 |
| 2 | 102 | 12.285 | 28.06 | — | — |
| 3 | 103 | −24.856 | 1.50 | 1.49700 | 81.61 |
| 4 | 104 | 65.876 | 3.06 | 1.83400 | 37.34 |
| 5 | 105 | −85.897 | [D5] | — | — |
| 6 | 201 | 30.934 | 10.00 | 1.50915 | 56.36 |
| 7 | 202 | −560.746 | 4.52 | — | — |
| 8 | 203 | 32.320 | 6.01 | 1.49700 | 81.61 |
| 9 | 204 | −32.367 | 0.10 | — | — |
| 10 | 205 | −751.287 | 1.50 | 1.80610 | 40.73 |
| 11 | 206 | 24.862 | 3.13 | — | — |
| 12 | 207 | 32.682 | 8.00 | 1.49700 | 81.61 |
| 13 | 208 | −24.062 | 0.10 | — | — |
| 14 | 209 | 72.685 | 1.50 | 1.80610 | 33.27 |
| 15 | 210 | 26.131 | [D13] | — | — |
| 16 | 301 | −100.000 | 3.00 | 1.77250 | 49.62 |
| 17 | 302 | −44.000 | 0.70 | — | — |
| 18 | C01 | ∞ | 3.00 | 1.48745 | 69.00 |
| 19 | C02 | ∞ | — | — | — |

TABLE 3-continued

Conical constant and aspherical Coefficient

| Face 102 | Face 201 | Face 205 |
|---|---|---|
| K = −8.53464e−01 | K = −7.65076e−01 | K = 0.00000e+00 |
| A = 9.29611e−06 | A = −5.36023e−06 | A = −3.01224e−05 |
| B = 6.18912e−08 | B = −6.35189e−09 | B = −1.55874e−08 |
| C = −3.02861e−10 | C = −1.28648e−12 | C = 1.48437e−10 |
| D = 9.74927e−13 | D = 5.78649e−13 | D = −2.37836e−13 |
|  | E = −2.03644e−15 |  |

TABLE 4

|  | Wide angle End | Intermediate area | Telephoto End |
|---|---|---|---|
| f | 15.98 | 23.90 | 31.42 |
| $F_{no}$ | 2.29 | 2.88 | 3.45 |
| 2ω | 65.81 | 46.20 | 35.91 |

Gap changing depending on zooming

|  | | | |
|---|---|---|---|
| D5 | 26.19 | 10.07 | 2.31 |
| D13 | 34.00 | 46.15 | 57.68 |

| Serial No. | Face No. | r | d | $n_d$ | $v_d$ |
|---|---|---|---|---|---|
| 1 | 101 | 36.639 | 1.50 | 1.69400 | 56.36 |
| 2 | 102 | 12.973 | 25.22 | — | — |
| 3 | 103 | −25.978 | 1.50 | 1.49700 | 81.61 |
| 4 | 104 | 47.484 | 7.96 | 1.83400 | 37.34 |
| 5 | 105 | −150.205 | [D5] | — | — |
| 6 | 201 | 28.202 | 10.00 | 1.49700 | 81.50 |
| 7 | 202 | −56.719 | 2.38 | — | — |
| 8 | 203 | −223.169 | 15.01 | 1.49700 | 81.61 |
| 9 | 204 | −37.689 | 0.10 | — | — |
| 10 | 205 | 572.720 | 1.50 | 1.83400 | 37.34 |
| 11 | 206 | 21.271 | 0.16 | — | — |
| 12 | 207 | 21.372 | 5.65 | 1.49700 | 81.61 |
| 13 | 208 | −37.219 | 0.10 | — | — |
| 14 | 209 | 26.750 | 1.87 | 1.80420 | 46.50 |
| 15 | 210 | 23.507 | [D13] | — | — |
| 16 | 301 | −100.000 | 3.00 | 1.77250 | 49.62 |
| 17 | 302 | −44.000 | 0.70 | — | — |
| 18 | C01 | ∞ | 3.00 | 1.48745 | 69.00 |
| 19 | C02 | ∞ | — | — | — |

Conical constant and aspherical Coefficient

| Face 102 | Face 201 | Face 205 |
|---|---|---|
| K = −3.74508e−01 | K = 1.82057e−01 | K = −1.48941e+01 |
| A = −5.62630e−06 | A = −3.15937e−06 | A = 1.09197e−05 |
| B = −3.97361e−08 | B = 1.05538e−08 | B = 2.78056e−08 |
| C = 1.35399e−10 | C = 5.70557e−11 | C = 7.51268e−11 |
| D = 1.17572e−12 | D = 4.88068e−14 | D = 9.50839e−14 |

TABLE 5

|  | Embod. 1 | Embod. 2 | Embod. 3 | Embod. 4 |
|---|---|---|---|---|
| Cond. Ex. (1) | 8.79 | 8.64 | 8.52 | 8.73 |
| Cond. Ex. (2) | 2.13 | 2.13 | 2.13 | 2.13 |
| Cond. Ex. (3) | −0.72 | −0.73 | −0.72 | −0.71 |
| Cond. Ex. (4) | −0.70 | −0.72 | −0.70 | −0.68 |
| Cond. Ex. (5) | 1.94 | 1.94 | 1.94 | 1.97 |
| Cond. Ex. (6) | 2.30 | 2.03 | 2.19 | 2.31 |
| Cond. Ex. (7) | −0.57 | −0.58 | −0.57 | −0.54 |
| Cond. Ex. (8) | 1.16 | 1.37 | 1.30 | 1.23 |
| Cond. Ex. (9) | 31.62 | 31.65 | 31.65 | 31.62 |
| Cond. Ex. (10) | 0.60 | 0.59 | 0.65 | 0.50 |
| Cond. Ex. (11) | −0.57 | −0.47 | −0.54 | −0.61 |
| Cond. Ex. (12) | 40.61 | 40.61 | 40.88 | 44.27 |
| Cond. Ex. (13) | 81.61 | 81.61 | 81.61 | 81.61 |
| Cond. Ex. (14) | −0.68 | −1.06 | −0.96 | −0.75 |

TABLE 5-continued

|  | Embod. 1 | Embod. 2 | Embod. 3 | Embod. 4 |
|---|---|---|---|---|
| Cond. Ex. (15) | 0.51 | 0.50 | 0.52 | 0.57 |
| Cond. Ex. (16) | 0.44 | 0.39 | 0.61 | 0.68 |

What is claimed is:

1. A zoom lens system comprising, arranged sequentially from the enlarging side to the reducing side, a first lens group having a negative refractive power as a whole and including, arranged sequentially from the enlarging side to the reducing side, a lens having a negative refractive power and of meniscus convex toward the enlarging side, a lens having a negative refractive power and a lens having a positive refractive power; a second lens group having a positive refractive power as a whole and including, arranged sequentially from the enlarging side to the reducing side, a lens having a positive refractive power, a second lens having a positive refractive power, a lens having a negative refractive power, a biconvex lens having a positive refractive power and a lens having a negative refractive power and of meniscus convex toward the enlarging side; and a third lens group having a positive refractive power as a whole and including a single lens having a positive refractive power; and wherein:

the first lens group is adapted to move along an optical axis from the enlarging side to the reducing side during zooming from the wide angle end to the intermediate area, and also move along the optical axis from the reducing side to the enlarging side during zooming from the intermediate area to the telephoto end; and the second lens group is adapted to move along the optical axis from the reducing side to the enlarging side during zooming from the wide angle end to the telephoto end with the third lens group fixed during the zooming operation; and wherein:

the distance on the optical axis between a focused position and the enlarging side face of the lens of the first lens group disposed on the most enlarging side at the wide angle end satisfies a conditional expression (1) below; a positional relationship between the second and third lens groups at the wide angle end satisfies a conditional expression (2) below; the magnification of the second lens group at the wide angle end satisfies a conditional expression (3) below; the refractive power of the first lens group satisfies a conditional expression (4); and the magnification of the second lens group at the telephoto end satisfies a conditional expression (5) below:

$$7.0 < TL/f_w < 10.0 \quad (1)$$

$$1.8 < d_{IIw}/f_w < 2.5 \quad (2)$$

$$-1.0 < m_{IIw} < -0.5 \quad (3)$$

$$-1.0 < f_w/f_1 < -0.55 \quad (4)$$

$$1.4 < m_{IIT}/m_{IIw} < 2.8 \quad (5)$$

where TL is the distance on the optical axis between the focused position and the enlarging side face of the lens disposed on the most enlarging side of the first lens group at the wide angle end (in a focused state where the distance between the most enlarging side face of the first lens group and a subject which the most enlarging side face of the first lens group faces is 1700 mm);

$f_w$ is a composite focused distance of the whole lens system at the wide angle end (in the same focused state as mentioned above);

$d_{IIw}$ is a gap between the second and third lens groups at the wide angle end;

$f_1$ is a composite focused distance of the first lens group at the wide angle end;

$m_{IIw}$ is the magnification of the second lens group at the wide angle end; and $m_{IIT}$ is the magnification of the second lens group at the telephoto end.

2. The zoom lens system of claim 1, wherein the dimensions of the first lens group along the optical axis satisfy a conditional expression (6) below; the refractive power of the lens disposed on the most enlarging side of the first lens group satisfies a conditional expression (7) below; the shape of the reducing side face of the lens disposed on the most enlarging side of the first lens group satisfies a conditional expression (8) below; and the dispersive characteristics of an optical glass material of the respective lenses of the first lens group satisfies a conditional expression (9) below:

$$1.7 < L_1/f_w < 2.7 \tag{6}$$

$$-0.8 < f_w/f_1 < -0.3 \tag{7}$$

$$0.9 < f_w/r_2 < 1.6 \tag{8}$$

$$25 < (V_1+V_2)/2 - V_3 \tag{9}$$

where $L_1$ is the distance along the optical axis between the enlarging side face of the lens disposed on the most enlarging side of the first lens group and the reducing side face of the lens disposed on the most reducing side of the first lens group;

$f_1$ is the focal distance of the lens disposed on the most enlarging side of the first lens group;

$r_2$ is a radius of curvature of the reducing side face of the lens disposed on the most enlarging side of the first lens group;

$V_1$ is an Abbe's number of the lens having a negative refractive power disposed on the most enlarging side of the first lens group;

$V_2$ is an Abbe's number of the lens having a negative refractive power disposed on the reducing side of the first lens group; and $V_3$ is an Abbe's number of the lens having a positive refractive power disposed on the most reducing side of the first lens group.

3. The zoom lens system of claim 1, wherein the focusing operation is performed by moving the first lens group along the optical axis, and wherein the lens of the first lens group disposed on the most enlarging side has an aspherical reducing-side face.

4. The zoom lens system of claim 1, wherein the composite refractive power of the two lenses disposed on the enlarging side of the second lens group satisfies a conditional expression (10) below; and the negative refractive power of the third lens having a negative refractive power of the second lens group satisfies a conditional expression (11) below, the dispersive characteristic of an optical glass material of the three lenses disposed on the enlarging side of the second lens group satisfies a conditional expression (12) below; the dispersive characteristic of an optical glass material of the fourth lens of the second lens group satisfies a conditional expression (13) below; and the enlarging side face shape of the lens disposed on the most enlarging side of the second lens group and the reducing side face shape of the second lens of the second lens group satisfy a conditional expression (14) below:

$$0.4 < f_w/f_{4-5} < 0.8 \tag{10}$$

$$-0.7 < f_w/f_6 < -0.4 \tag{11}$$

$$30 < (V_5+V_7)/2 - V_6 \tag{12}$$

$$69 < V_7 \tag{13}$$

$$-1.2 < r_{II1}/r_{II4} < -0.5 \tag{14}$$

where $f_{4-5}$ is a composite focal distance of the two lenses having a positive refractive power disposed on the enlarging side of the second lens group;

$f_6$ is a focal distance of the third lens from the enlarging side of the second lens group:

$V_5$ is an Abbe's number of the second lens having a positive refractive power from the enlarging side of the second lens group;

$V_6$ is an Abbe's number of the third lens having a negative refractive power from the enlarging side of the second lens group;

$V_7$ is an Abbe's number of the fourth lens having a positive refractive power from the enlarging side of the second lens group;

$r_{II1}$: is a radius of curvature of the enlarging side face of the lens of disposed on the most enlarging side the second lens group; and $r_{II4}$: is a radius of curvature of the reducing side face of the second lens from the enlarging side of the second lens group.

5. The zoom lens system of claim 4, wherein the enlarging side face of the lens disposed on the most enlarging side of the second lens group is aspherical and satisfies a conditional expression (15) below; and the reducing side face of the lens disposed on the most reducing side of the second lens group satisfies a conditional expression (16) below:

$$0.4 < f_w/r_{II1} < 0.7 \tag{15}$$

$$0.3 < f_w/r_{II10} < 0.8 \tag{16}$$

where $r_{II10}$ is a radius of curvature of the reducing side face of the lens disposed on the most reducing side of the second lens group.

6. A projector comprising the zoom lens system of claim 1.
7. A projector comprising the zoom lens system of claim 2.
8. A projector comprising the zoom lens system of claim 3.
9. A projector comprising the zoom lens system of claim 4.
10. A projector comprising the zoom lens system of claim 5.

* * * * *